(12) United States Patent
Scheidhauer et al.

(10) Patent No.: US 9,176,700 B2
(45) Date of Patent: Nov. 3, 2015

(54) SYSTEMS AND/OR METHODS FOR EFFICIENT RENDERING OF BUSINESS MODEL RELATED VECTOR GRAPHICS

(75) Inventors: Ralf Scheidhauer, Homburg (DE); Rocco De Angelis, Schwalbach (DE)

(73) Assignee: SOFTWARE AG, Darmstadt (DE)

( * ) Notice: Subject to any disclaimer, the term of this patent is extended or adjusted under 35 U.S.C. 154(b) by 1039 days.

(21) Appl. No.: 13/149,409

(22) Filed: May 31, 2011

(65) Prior Publication Data

US 2012/0306898 A1 Dec. 6, 2012

(51) Int. Cl.
*G06Q 10/06* (2012.01)
*G06F 3/14* (2006.01)
*H04L 29/08* (2006.01)
*G06F 9/44* (2006.01)

(52) U.S. Cl.
CPC *G06F 3/14* (2013.01); *G06Q 10/06* (2013.01); *H04L 67/06* (2013.01); *G06F 8/10* (2013.01); *G09G 2370/027* (2013.01)

(58) Field of Classification Search
CPC .................................................. H04L 67/06
See application file for complete search history.

(56) References Cited

U.S. PATENT DOCUMENTS

| | | | | |
|---|---|---|---|---|
| 5,915,098 | A * | 6/1999 | Palmer et al. | 709/247 |
| 7,430,343 | B2 * | 9/2008 | Hayes et al. | 382/305 |
| 7,463,263 | B2 * | 12/2008 | Gilboa | 345/440 |
| 8,355,021 | B2 * | 1/2013 | Wenger | 345/424 |
| 8,656,055 | B2 * | 2/2014 | Das | 709/246 |

OTHER PUBLICATIONS

PNG (Portable Network Graphics). [Online] http://www.libpng.org/pub/png. [retrieved May 31, 2011].
HTML & CSS. *W3C*. [Online] [retrieved May 31, 2011] http://www.w3.org/standards/webdesign/htmlcss.
ECMA. [Online] [retrieved May 31, 2011] http://www.ecma-international.org/.
Tile engine. *Wikipedia*. [Online] [retrieved May 31, 2011] http://en.wikipedia.org/wiki/Tile_engine.
Google Maps User Guide. [Online] [retrieved May 31, 2011] http://maps.google.com/support/bin/static.py?hl=en&page=guide.cs&guide=21670&from=216708&rd=1.
Scalable Vector Graphics. *W3C*. [Online] [retrieved May 31, 2011] http://www.w3.org/Graphics/SVG/.
Vector Markup Language. *W3C*. [Online] [retrieved May 31, 2011] http://www.w3.org/TR/NOTE-VML.html.
SWF File Format Specification. *Adobe*. [Online] [retrieved May 31, 2011] http://www.adobe.com/content/dam/Adobe/en/devnet/swf/pdf/swf_file_format_spec_v 10.pdf.
HTML5. *W3C*. [Online] [retrieved May 31, 2011] http://www.w3.org/TR/2011/WDhtml5-20110113/.

(Continued)

*Primary Examiner* — Joni Richer
(74) *Attorney, Agent, or Firm* — Nixon & Vanderhye PC

(57) ABSTRACT

Certain example embodiments described herein relate to systems and/or methods for efficient rendering of vector graphics corresponding to business models generated by a business process management (BPM) package. Such graphics may be provided in an Abstract Vector Graphic (AVG) format. In certain example embodiments, graphic images are provided to an AVG generator, along with a renderer fragment file including static code that is independent from the generated graphic but dependent on the target platform. The AVG generator in certain example embodiments produces program logic that is executable on the target device to cause the display of the graphic.

33 Claims, 14 Drawing Sheets

(56) References Cited

OTHER PUBLICATIONS

Flash CS3 resources. *Adobe*. [Online] [retrieved May 31, 2011] http://www.adobe.com/support/documentation/en/flash/.
Signavio. *Signavio*. [Online] [retrieved May 31, 2011] http://www.signavio.com.
BPMN Community. *BPMN Community*. [Online] [retrieved May 31, 2011] http://en.bpmn-community.org.
HTML Living Standard. *WHATWG community*. [Online] [retrieved May 31, 2011] http://www.whatwg.org/specs/web-apps/current-work/multipage/the-canvaselement.html.
Lucidchart. [Online] [retrieved May 31, 2011] http://www.lucidchart.com.
Creately. [Online] [retrieved May 31, 2011] http://creately.com.
WebSphere Business Compass. [Online] [retrieved May 31, 2011] http://www.01.ibm.com/software/integration/business-compass.
Enhanced Metafile Format Specification. *msdn Microsoft*. [Online] [retrieved May 31, 2011] http://msdn.microsoft.com/de-de/library/cc204166.aspx.
Windows Metafile Format Specification. *msdn Microsoft*. [Online] [retrieved May 31, 2011] http://msdn.microsoft.com/de-de/library/cc215212.aspx.
Extensible Markup Language (XML) 1.0 (Fifth Edition). *W3C*. [Online] [retrieved May 31, 2011] http://www.w3.org/TR/REC-xml/#dt-doctype.
Extensible Markup Language (XML) 1.0 (Fifth Edition). *W3C*. [Online] [retrieved May 31, 2011] http://www.w3.org/TR/2008/REC-xml-20081126/.
RFC-4227—The application/json Media Type for JavaScript Object Notation (JSON). *RFC*. [Online] http://tools.ietf.org/html/rfc4627. [retrieved May 31, 2011].
Business Process Model and Notation (BPMN). *OMG*. [Online] [retrieved May 31, 2011] http://www.omg.org/spec/BPMN/2.0/.
Unified Modeling LanguageTM (UML®). *OMG*. [Online] [retrieved May 31, 2011] http://www.omg.org/spec/UML.
Garbage Collection in IE6. *Ajaxian*. [Online] [retrieved May 31, 2011] http://ajaxian.com/archives/garbage-collection-in-ie6.
Backus-Naur Form. *Wikipedia*. [Online] [retrieved May 31, 2011] http://en.wikipedia.org/wiki/Backus%E2%80%93Naur_Form.
Javadoc AffineTransform. *Oracle*. [Online] [retrieved May 31, 2011] http://download.oracle.com/javase/6/docs/api/java/awt/geom/AffineTransform.html.
HTML 5 canvas Images. *WHATWG community*. [Online] [retrieved May 31, 2011] http://www.whatwg.org/specs/web-apps/current-work/multipage/the-canvaselement.html#images.
BPMN community. *Process Simple Customer*. [Online] [retrieved May 31, 2011] http://de.bpmn-community.org/process/show/362 (translation).
International Telecommunication Union, The International Telegraph and Telephone Consultative Committee (CCITT) Recommendation T.81, Terminal Equipment and Protocols for Telematic Services, "Information Technology—Digital Compression and Coding of Continuous-Tone Still Images—Requirements and Guidelines." [online] [retrieved Jun. 7, 2011] http://www.w3.org/Graphics/JPEG/itu-t81.pdf.
Alfred V. Aho et al., "Compilers. Principles, Techniques, & Tools," Second Edition, Copyright 2007, ISBN 0321491696, Jan. 11, 2011.

* cited by examiner

```
public class Renderer { public void render(Device device) {
    AbstractCommand commands[] = getCommands();
    for (AbstractCommand command : commands) {
      command.execute(this);
    }
  } private static final AbstractCommand[] commands = {
    new SetBrushCommand("#ffff00"),
    new SetShapeCommand(new Rectangle(338, 396, 524, 308)),
    new FillCommand(),
    new SetPenCommand(6, DASHED, "#ff0000"),
    new DrawCommand()
  };

private AbstractCommand[] getCommands() { return commands; }
  ...
```

Fig. 11

SYSTEMS AND/OR METHODS FOR EFFICIENT RENDERING OF BUSINESS MODEL RELATED VECTOR GRAPHICS

FIELD OF THE INVENTION

Certain example embodiments described herein relate to systems and/or methods for efficient rendering of vector graphics. More particularly, certain example embodiments relate to graphics provided in an Abstract Vector Graphic (AVG) format. In certain example embodiments, graphic images are provided to an AVG generator, along with a renderer fragment file including static code that is independent from the generated graphic but dependent on the target platform. The AVG generator in certain example embodiments produces program logic that is executable on the target device to cause the display of the graphic.

BACKGROUND AND SUMMARY OF EXAMPLE EMBODIMENTS OF THE INVENTION

The ARIS product suite provided by the assignee of the instant invention is one of the market leading business process management tools. Customers use ARIS to document and analyze their internal processes and organization. The business models created with ARIS (currently a Java-based tool) will be later published into the organization's internal website so that the created models are available to all employees. FIG. 1 is an example model created in ARIS and, in particular, shows the Sprint phase of a Scrum project.

The models created with ARIS can be very large. Indeed, some customers have created models that are larger than 5×5 meters. These very large models generally are published to the web for availability purposes, and users may want to zoom in and out to navigate within the model. One challenge associated with bringing ARIS models into a web browser is the very large size that results in memory usage and can often lead to rendering performance problems.

The web today offers different possibilities to draw an ARIS model (or any other graphic model) into a web browser. For example, in with a bitmap-based graphic, the model can be represented as one large bitmap-based web graphic format such as PNG or JPEG. The interaction can be done with HTML and JavaScript. As shown in FIG. 2, for example, an ARIS ModelViewer may be embedded in a webpage and provide a view port. The single large bitmap-based graphic is "behind" the viewport. Navigation can be performed using HTML and/or JavaScript tools.

As another example, the model can be represented as a bitmap based graphic, but instead of using one big graphic, the model is split into several tiles. This tiled graphic technique is well known in computer graphics and generally reduces memory usage and increases rendering performance. This technique has become very popular in the computer game area, as well as for some web based applications. For example, Google Maps uses this technique. FIG. 3 demonstrates the tile-based approach for displaying a model in a view port. As shown in FIG. 3, the ARIS ModelViewer view port generates the model by re-using tiles that are sent from a central repository. However, only a few small graphics (tiles) of the model are sent to the client, with the client itself generating the larger model by re-using the small tiles.

Still another option involves using vector-based graphics. In this option, the model can be represented using a vector-based format that is available for the web (and that will be supported by the common web browser) such as, for example, SVG or VML. The Adobe Flash SWF format also is a vector-based format and could theoretically be used to draw ARIS models in the web. Vector-based images have the advantage that the graphic can be scaled indefinitely without degrading quality. FIG. 4 demonstrates a vector graphic based approach to displaying a model in a view port, where vector graphics are sent to the client and interpreted by the web browser for display in the view port.

As still another option, browser side rendering (e.g., using HTML 5 Canvas or Flash rendering) may be used to send the model data to the web browser where this data will be interpreted and the model drawn by using HTML 5 or Flash. This approach is very similar to vector-based graphic approach described above. However, most common browsers already provide a renderer for vector-based graphic formats like SVG, which interprets the SVG format and translates it into graphic commands of the web browser drawing API. FIG. 5 shows model data being fed to a renderer for ultimate display in a view port in accordance with browser-side rendering techniques. The renderer interpreters the model data and creates the model graphic by using the drawing API provided by the web browser. The resulting model is displayed in the view port.

Current solutions unfortunately are not well suited to displaying ARIS type models. For instance, current solutions have restrictions regarding memory usage and rendering performance. For example, bitmap-based graphics have the disadvantages that a large image size results in a very high memory usage. Graphic formats like PNG and JPEG allow the image data to be compressed, but the browser needs to be able to decompress it to display it into the web page, thereby requiring processing power and overhead. Another disadvantage relates to the fact that bitmap-based formats cannot be scaled without losing quality. Scaling a bitmap-based image down also results in aliasing problems such that graphic information is oftentimes lost.

By contrast, the tiled based approach is advantageous in terms of memory usage and performance. Instead of creating one large graphic representing the ARIS model, the graphic can be split in several small parts (tiles) that can be repeated. An ARIS model oftentimes contains the same symbol (e.g., as in the example in FIG. 1 above). In addition, it is possible to load only the tiles that are currently visible to the user on his screen. Unfortunately, however, this approach is disadvantageous in that it is not easy to scale the graphic (model). Thus, current solutions involve creating tiles for predefined zoom/scale levels. Otherwise, free scaling of the model typically is not possible without losing quality.

Using a vector-based graphic to illustrate an ARIS model into a web browser also has its disadvantages. For instance, the memory usage of vector formats like SVG and VML, which will be supported by the web browsers, is comparable to a bitmap-based graphic format. Although not as high, it still is often seen as unacceptable. In addition, it can often take a long time to render very large SVG and VML structures.

Although the first three approaches provide a pre-rendered graphic that is to be transferred to the web browser and displayed to the user, with HTML 5 and the introduction of the "Canvas" element, it is possible to draw graphics programmatically by using a drawing API that will be provided by the web browsers. A similar approach also is possible through Adobe Flash technology. This approach involves sending some data to the web browser that will be interpreted programmatically and rendered into the web browser by using the provided drawing API. This approach has the benefit that the size of the image transferred to the browser can be significant smaller compared to the size of the generated graphic. On the other hand, this approach has the disadvantage that the step (the business logic) of interpreting, calculating, and transferring the data into drawing commands can be very expensive.

Although a solution between browser-side rendering and vector-based graphics seems to be a good option, it may not solve performance problems for very large graphics/models.

Thus, it will be appreciated by those skilled in the art that there is a need for improved techniques associated with the display of models/graphics. For instance, it will be that efficiency could be increased for very large models/graphics, while keeping processing and memory requirements low.

One aspect of certain example embodiments relates to techniques that make it possible to very quickly render vector-based graphics in a web browser or other target platform or device. The graphics that are rendered in certain example embodiments are business model related graphics.

An aspect of certain example embodiments relates to techniques for rendering vector graphics that apply to concrete formats (such as, for example, EMF, WMF, SVG, etc.) and that are applicable to vector graphics in general.

Another aspect of certain example embodiments relates to a concrete graphics format that involves abstract vector graphics (AVG).

Another aspect of certain example embodiments relates to providing graphic images to an AVG generator, along with a renderer fragment file including static code that is independent from the generated graphic but dependent on the target platform.

Another aspect of certain example embodiments relates to an AVG generator that produces program logic that is executable on the target device to cause the display of the graphic based on the program logic.

Still another aspect of certain example embodiments relates to receiving a business model created using a business process management (BPM) package and creating an AVG file based on the created business model, with the AVG file being made available for display on an external device (e.g., through a network).

Still another aspect of certain example embodiments relates to optimizing or improving the performance associated with the display of the AVG by using features present in, or made available by resort to, programming language. For instance, certain example embodiments may optimize or improve performance associated with the display of the AVG by using global constants, defining auxiliary functions and/or relying on inheritance, performing inlining, splitting constant and variable code parts, skipping commands outside of a view port or viewing area, and/or the like.

Still another aspect of certain example embodiments relates to commands, syntax, and/or semantics associated with illustrative AVG file formats.

In certain example embodiments, a method of generating an AVG file for subsequent display via a software application (e.g., a browser) on a remote device is provided. The AVG file corresponds to a graphical business process model generated in a business process management (BPM) software package. Information pertaining to the model is received. The AVG file is generated, via at least one processor, based on (a) the received information pertaining to the model, and (b) a renderer fragment file that includes code that is dependent on a platform of the remote device on which the model is to be displayed but independent from the received information pertaining to the model. The AVG file includes executable instructions for causing the model to be displayed in the software application.

In certain example embodiments, a method of displaying a graphical model on a remote device is provided. An AVG file is received on the remote device, with the AVG file having been generated based on (a) information pertaining to the model, and (b) static code that is dependent on a platform of the remote device on which the model is to be displayed but independent from the received information pertaining to the model. The AVG file includes executable instructions for causing the model to be displayed on the remote device, with the instructions including vector-based commands associated with the re-creation of the model for display on the remote device, and with each said vector-based command having a predetermined format. The instructions are executed on the remote device so as to cause the model, or a portion thereof, to be re-created within a viewable area of a display provided thereto.

In certain example embodiments, an AVG generator is provided. A receiver is configured to receive information pertaining to a graphical business process model generated in a business process management (BPM) software package. At least one processor is configured to generate an AVG file based on (a) the information pertaining to the model received by the receiver, and (b) a renderer fragment file that includes code that is dependent on a platform of a remote device on which the model is to be displayed but independent from the received information pertaining to the model. The at least one processor is further configured to structure the AVG file as vector-based instructions so that the AVG file is executable on the remote device.

According to certain example embodiments, systems comprising an AVG generator and/or an AVG renderer may be provided. Such systems optionally may include, for example, a BPM software package.

According to certain other example embodiments, BPM systems may be provided, with such systems optionally including one or more of an AVG renderer, an optionally distributable AVG renderer, etc.

For instance, in certain example embodiments, a BPM system is provided, which includes a software tool configured to generate a graphical business process model, and with the graphical business process model being representable as an XML file. An AVG generator of the system comprises a receiver configured to receive the XML file corresponding to the generated graphical business process model; and at least one processor configured to generate an AVG file based on the XML file and code that is dependent on a platform of a remote device on which the model is to be displayed but independent from the received information pertaining to the model. The at least one processor is further configured to structure the AVG file as vector-based instructions so that the AVG file is executable on the remote device. A distributable, platform specific AVG renderer configured to receive AVG files and cause received AVG files, or portions thereof, to be displayed on a device hosting the AVG renderer, also may be provided.

In certain example embodiments, a method of generating an Abstract Vector Graphics (AVG) file is provided. Input corresponding to one or more graphical elements in an image is received. The input is processed, via at least one processor, to generate a set of commands that, when executed, cause the image or a portion thereof to be displayed on a display device. The set of commands is stored in an executable file on a non-transitory computer readable storage medium for subsequent execution on the display device. The commands are selected from a list of drawing commands including at least the following members: a set transform command that defines an affine transformation matrix and changes a transform member of a state associated with the display device, an add transform command that concatenates a parameter of the add transform command with the current transform member of the state, a set clip command that defines an area in which drawing commands have an effect and changes a clip member of the state, an add clip command that concatenates a parameter of the add clip command with the current clip member of the state, a draw image command that draws an encoded image on the display device, a set shape command that sets a shape member of the state, a set font command that changes a font member of the state, a set brush command that changes a brush member of the state, a set pen command that changes a pen member of the state, a set alpha command that changes an alpha member of the state, a fill command that draws a filled shaped on the display device using the shape and brush members of the state, a draw command that draws an outline of a shape on the display device using the shape and pen members of the state, a draw text command that draws a string at a specified location on the display device using the font member of the state, a save state command that makes a copy of the complete state and pushes it onto a state stack, and a restore state command that pops a topmost entry from the state stack and sets the current state to the popped topmost entry.

In certain example embodiments, a method of displaying on a display device an image or portion thereof stored in an Abstract Vector Graphics (AVG) file is provided. The AVG file is received. Commands stored in the AVG file are executed via at least one processor so as to display the image or portion thereof. The commands include at least the following drawing commands: a set transform command that defines an affine transformation matrix and changes a transform member of a state associated with the display device, an add transform command that concatenates a parameter of the add transform command with the current transform member of the state, a set clip command that defines an area in which drawing commands have an effect and changes a clip member of the state, an add clip command that concatenates a parameter of the add clip command with the current clip member of the state, a draw image command that draws an encoded image on the display device, a set shape command that sets a shape member of the state, a set font command that changes a font member of the state, a set brush command that changes a brush member of the state, a set pen command that changes a pen member of the state, a set alpha command that changes an alpha member of the state, a fill command that draws a filled shaped on the display device using the shape and brush members of the state, a draw command that draws an outline of a shape on the display device using the shape and pen members of the state, a draw text command that draws a string at a specified location on the display device using the font member of the state, a save state command that makes a copy of the complete state and pushes it onto a state stack, and a restore state command that pops a topmost entry from the state stack and sets the current state to the popped topmost entry.

Non-transitory computer readable storage mediums tangibly storing instructions for performing the above-summarized and/or other methods also are provided by certain example embodiments.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 11 is an example Java program for the AVG commands shown and described above in connection with the yellow box with red dashed border image, in accordance with certain example embodiments;

DETAILED DESCRIPTION OF EXAMPLE EMBODIMENTS OF THE INVENTION

Certain example embodiments relate to an abstract vector graphics (AVG) format. The example AVG format described herein may be applied to concrete vector-based graphics formats, as well as graphics in general. The example AVG described herein may be used to generate models/graphics for display in a browser window or other platform. Advantageously, the AVG format may work quickly and efficiently for large models/graphics, may scale well, and may have a reduced processing and/or memory load requirements.

In certain example embodiments, for each AVG (A), a separate program ($A_P$) is created whose job is to display A on the target device. In certain example implementations, $A_P$ is self-contained in the sense that it includes everything needed to display A and does not need to load/import any additional external data. The only parameter handed during execution of $A_P$ in some example implementation is the target device.

In certain example embodiments, because a computer is being created, features provided by programming languages may be used to improve the created program, e.g., by reducing the amount of main memory used, the CPU time, and/or the program size. This approach enables the definition of the AVG to be kept simple, while more intelligence is put into the process of generating the program.

The example techniques described herein may be used in connection with any programming language, whether compiled or interpreted. Thus, for example, the example techniques described herein may be used in connection with Java, C/C++, C#, JavaScript, etc.

Figure 1:
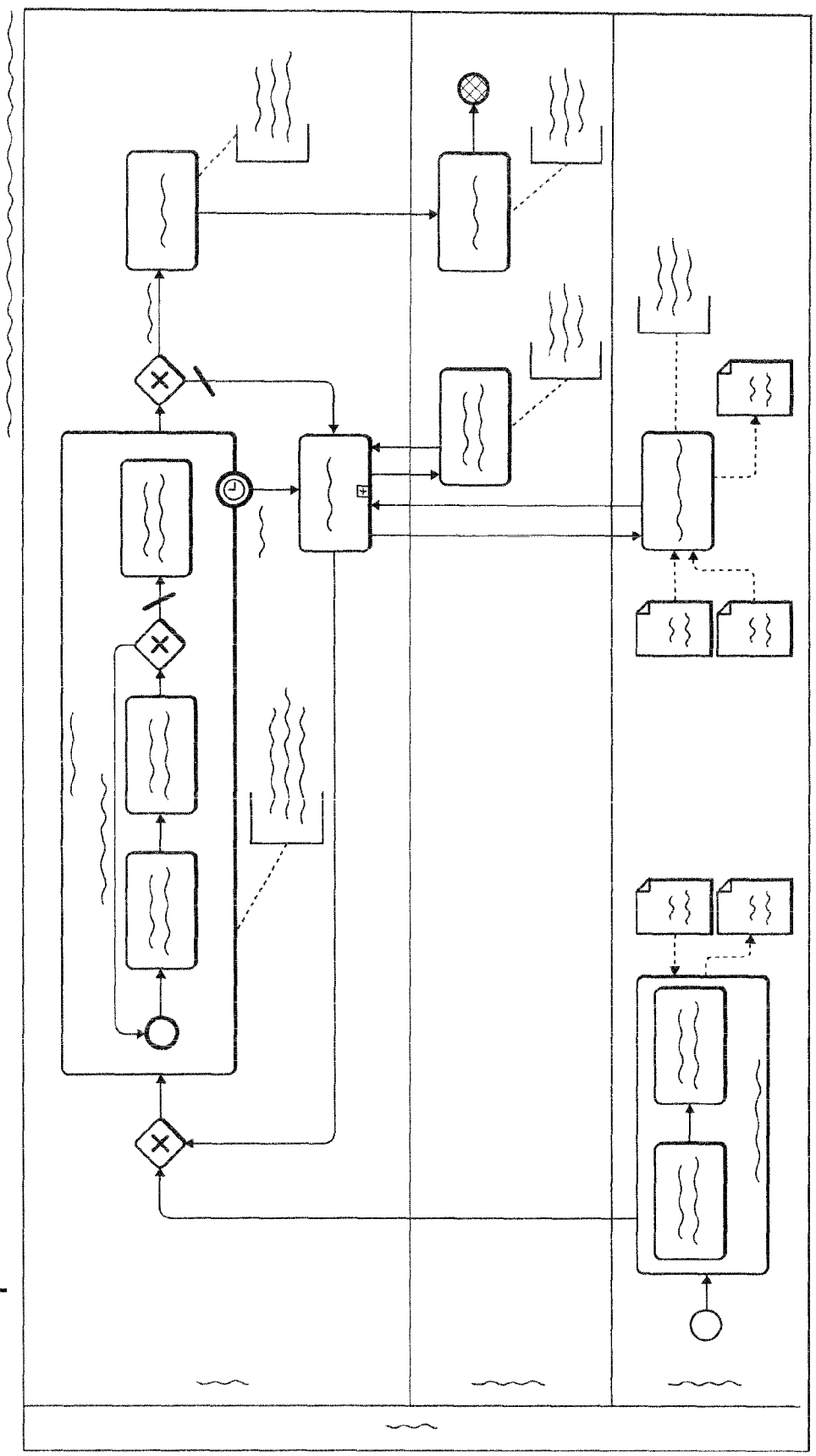
FIG. 1 is an example model created in ARIS and, in particular, shows the Sprint phase of a Scrum project.
Figure 2:
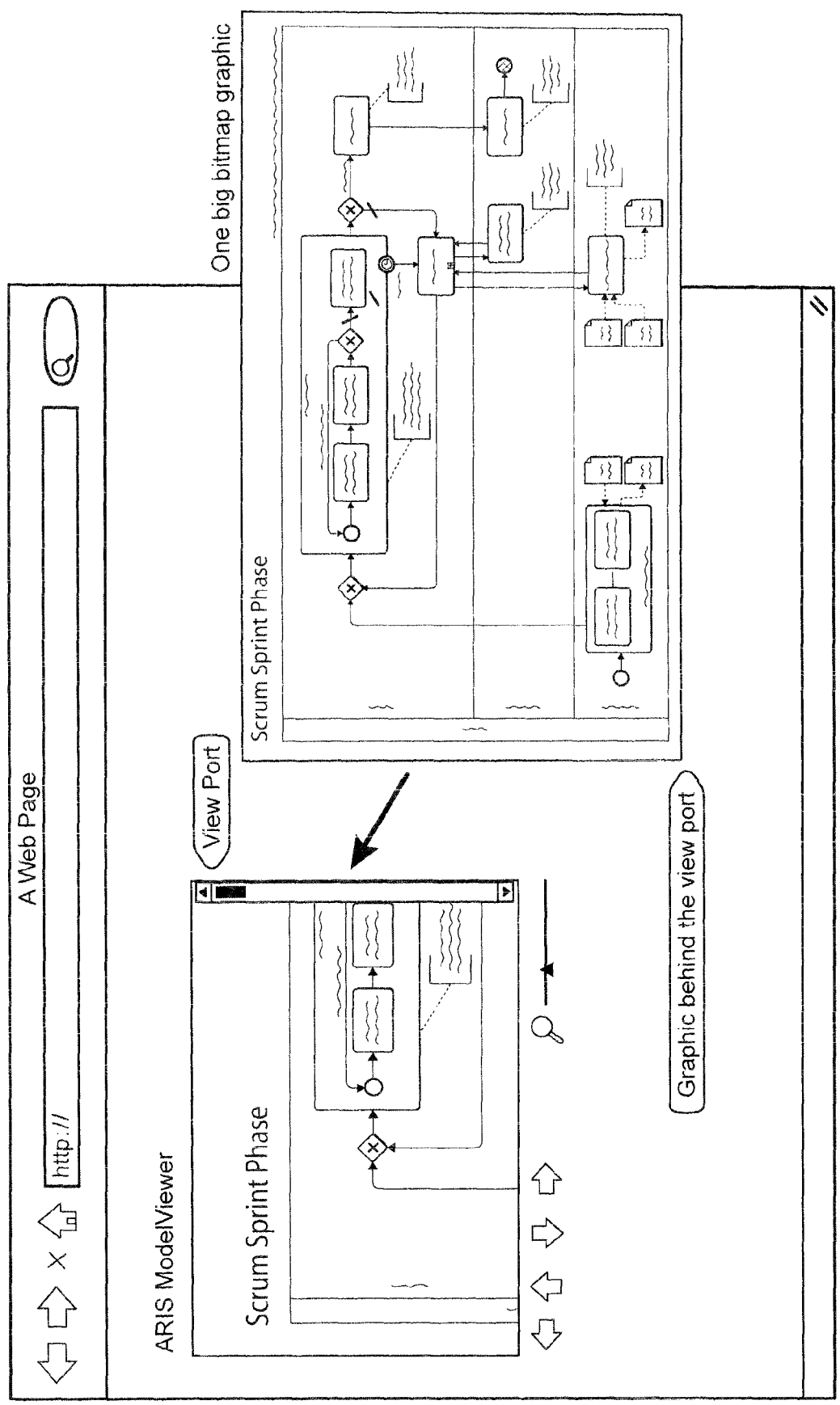
FIG. 2 demonstrates how a bitmap-based graphic can be displayed in a view port of a web browser.
Figure 3:
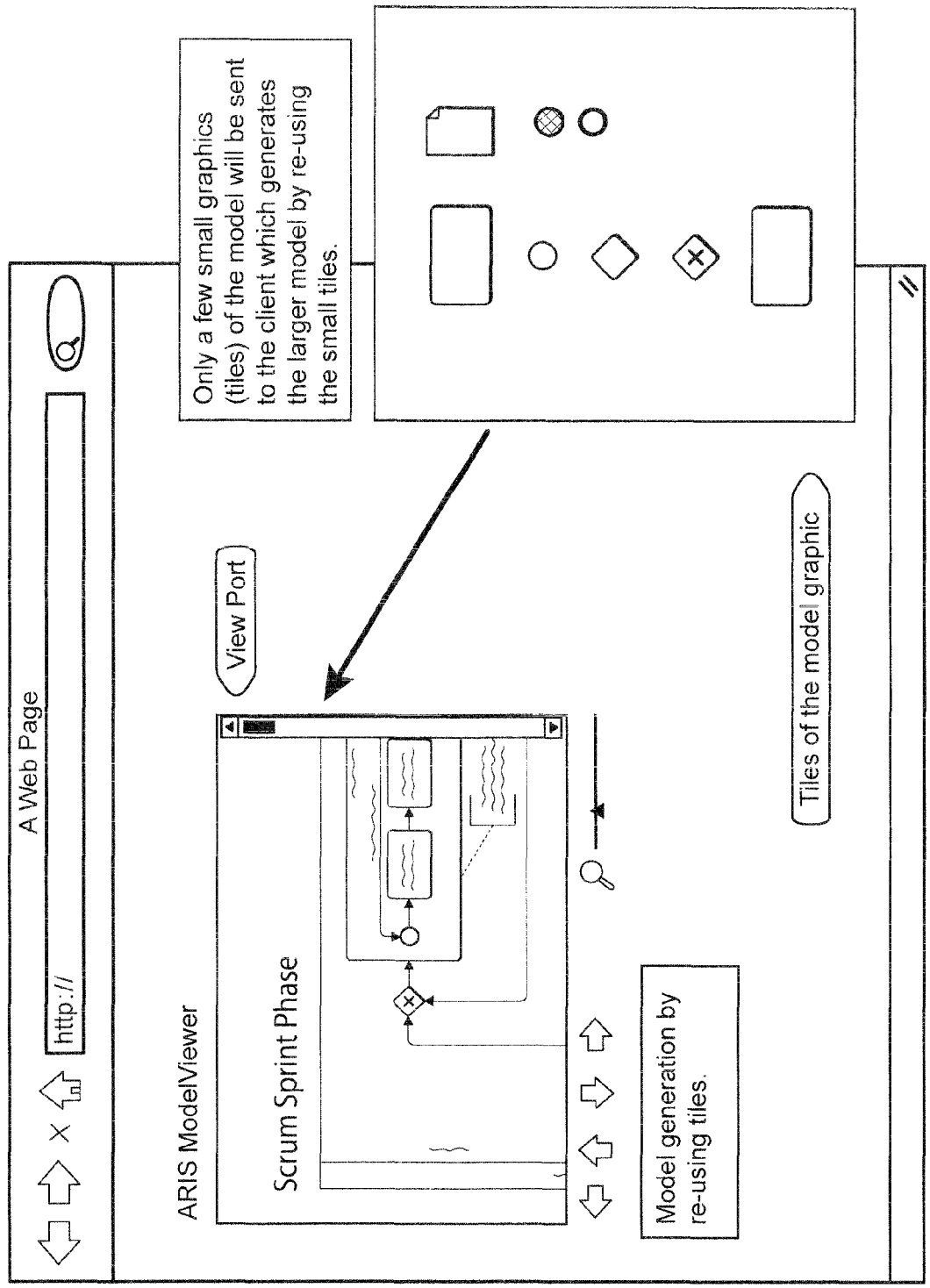
FIG. 3 demonstrates the tile-based approach for displaying a model in a view port of a web browser.
Figure 4:
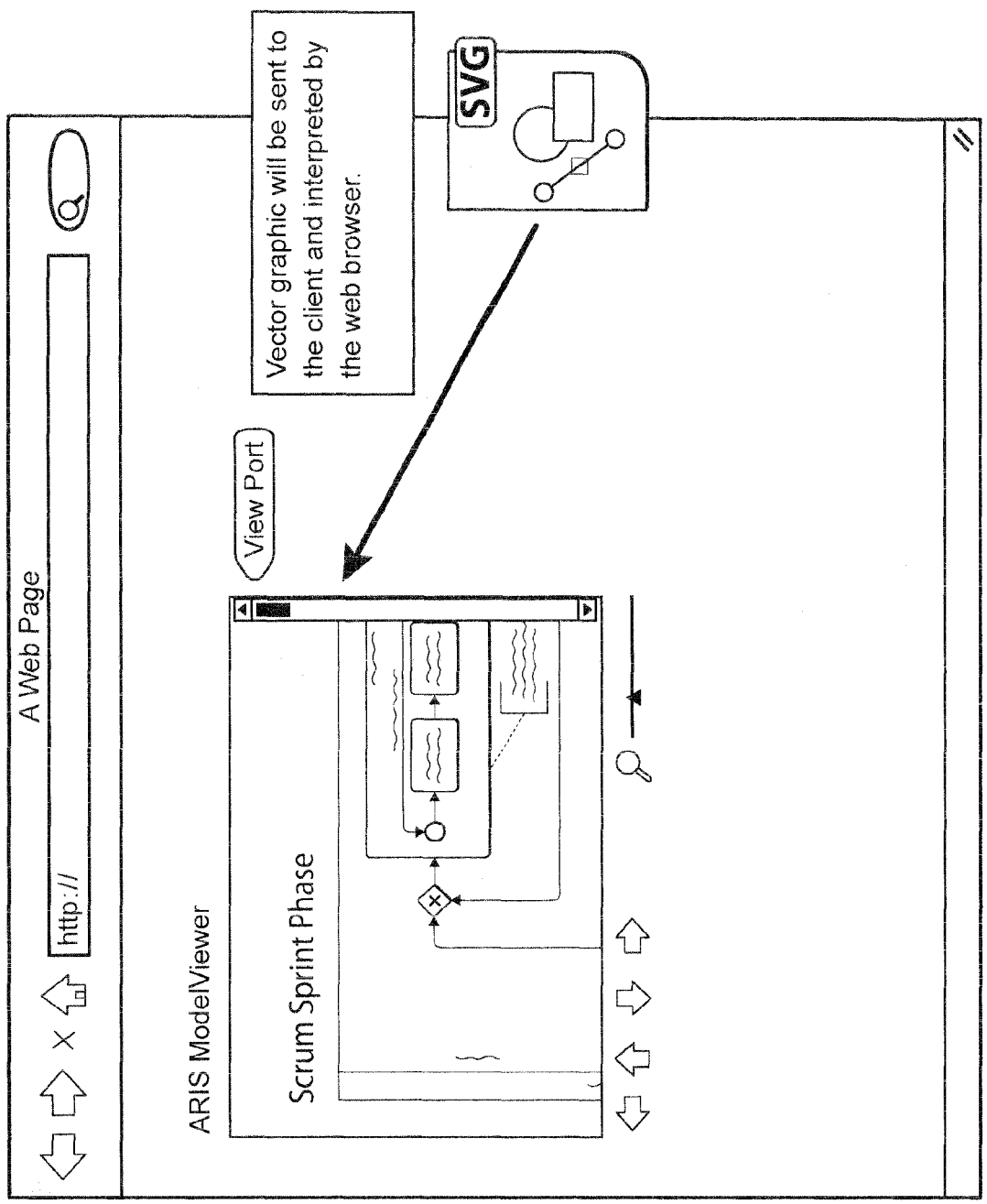
FIG. 4 demonstrates a vector graphic based approach to displaying a model in a view port of a web browser.
Figure 5:
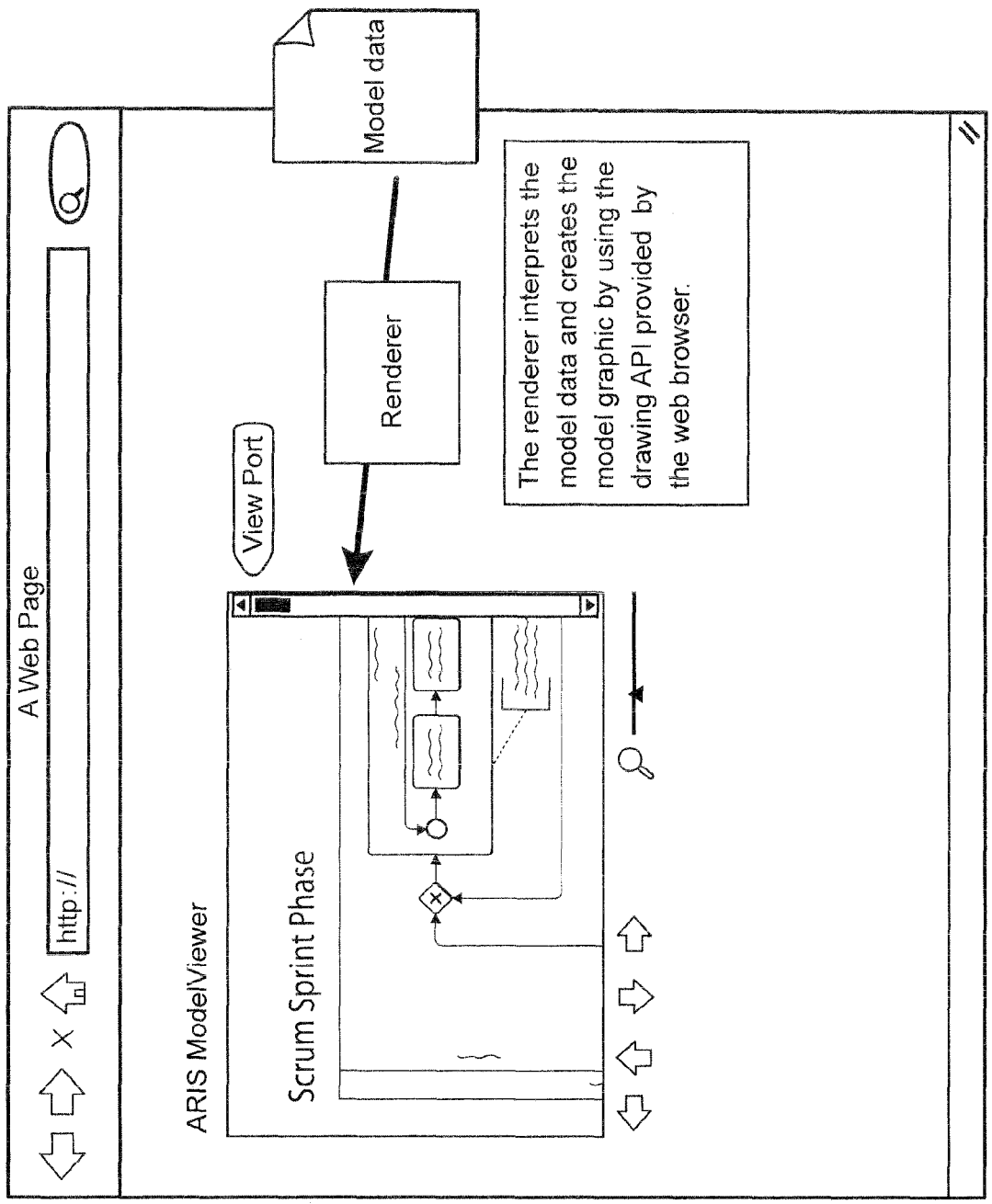
FIG. 5 shows model data being fed to a renderer for ultimate display in a view port in accordance with browser-side rendering techniques.
Figure 6:
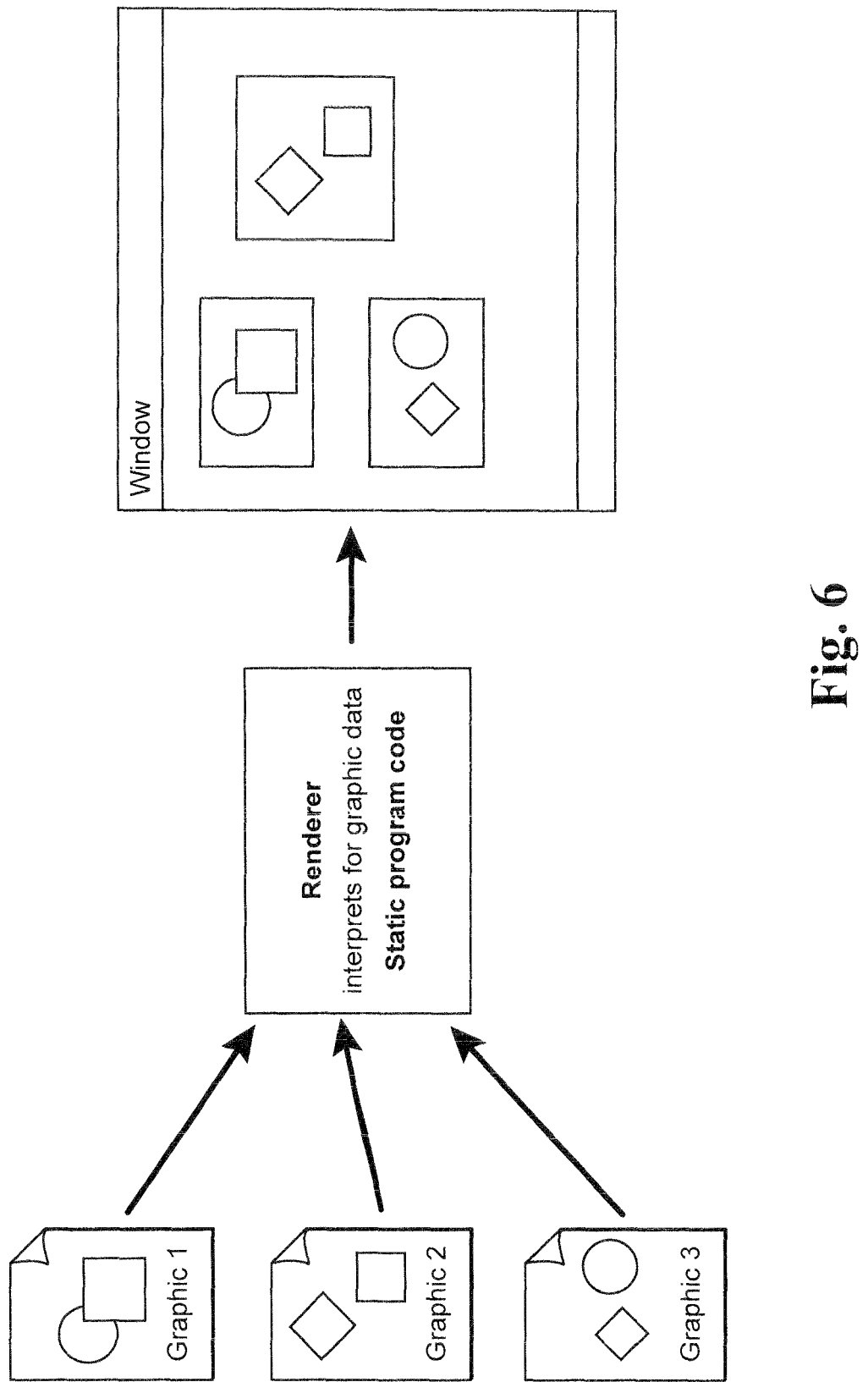
FIG. 6 shows conventional graphic rendering techniques, in which multiple graphics are passed to a renderer that uses static program code to interpret these graphics as graphic data for display in a window.

FIG. 6 shows conventional graphic rendering techniques, in which multiple graphics are passed to a renderer that uses static program code to interpret these graphics as graphic data for display in a window. However, the approach of certain example embodiments may be advantageous in that there is no need to write a parser for the external format. For instance, there is no need to define the format in a low level textual representation (e.g., a document type definition or DTD for an XML representation). Rather, the definition of the graphics format can be defined on a more abstract, semantic level, which nevertheless can be mathematically strict.

Another advantage relates to the ability to build up the internal data structures in quick and efficient manner, since it may be done directly within the target programming languages and thus may benefit from optimizations build into modern compilers and interpreters.

Still another advantage relates to the fact that features and techniques common to programming languages can be used for optimizations, e.g., as described in greater detail below.

Figure 7:
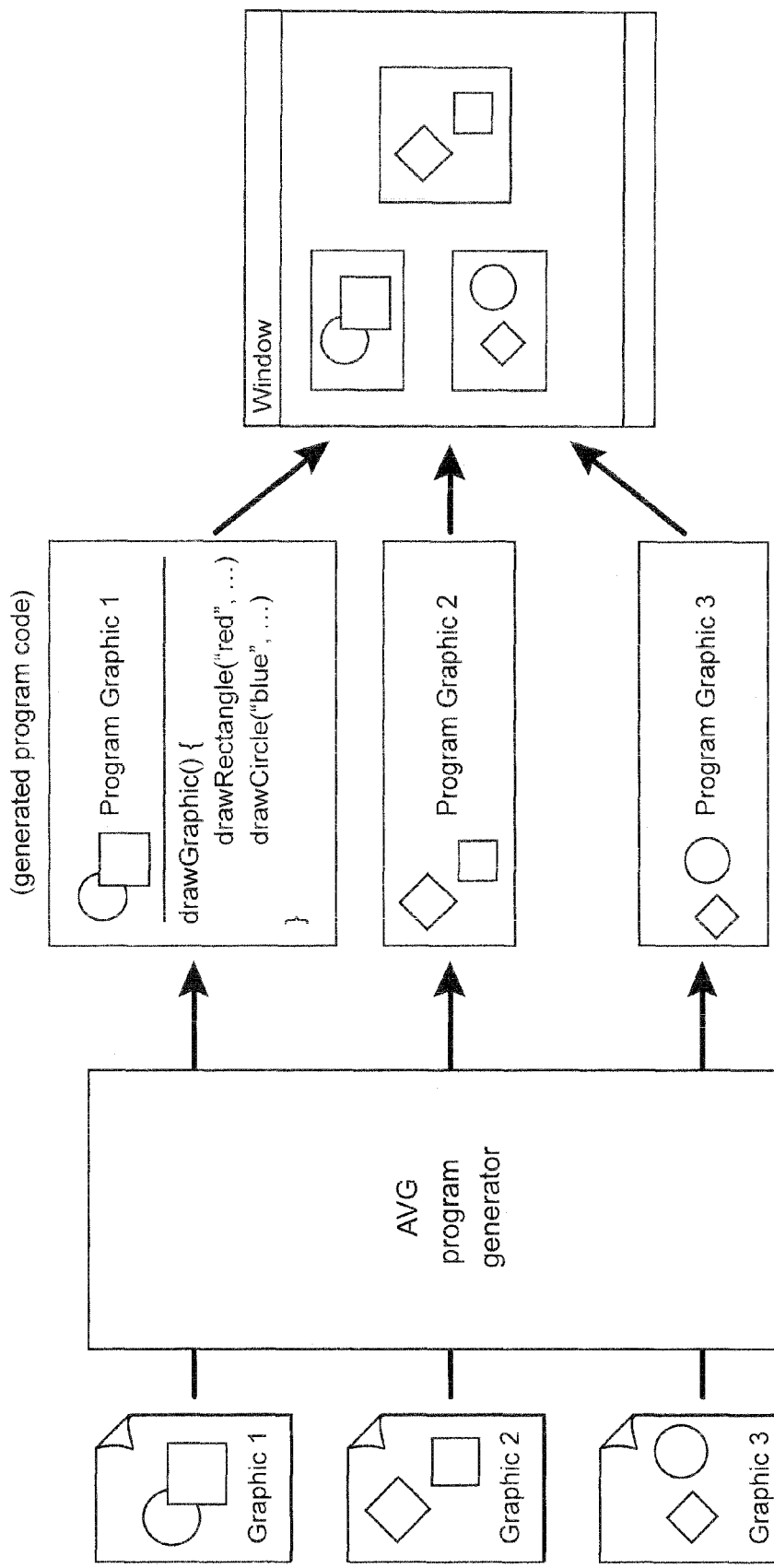
FIG. 7 is a block diagram illustrating an example AVG graphic code generator in accordance with certain example embodiments.

FIG. 7 is a block diagram illustrating an example AVG graphic code generator in accordance with certain example embodiments. As shown in FIG. 7, one or more graphics can be provided to an AVG program generator. The AVG code generator may help to convert the one or more graphics into a program code that is responsible only for drawing the graphic on the target platform, e.g., using a platform and device specific drawing API. The generated program code, in turn, is formatted in accordance with a programming language. The specific programming language and/or drawing API used may depend in part on the target platform. The API may receive the code and format the graphic for display in the window.

JavaScript Object Notation (JSON) is a lightweight text-based format for data interchange between applications. JSON is derived from the JavaScript programming language and makes it possible to describe simple data structures, as well as associated arrays. JSON is derived from JavaScript. It is language-independent, and parsers for the most common programming languages are available. Because each created JSON document is a syntactically legal JavaScript program, it can be executed in a JavaScript program by using the build-in JavaScript-function eval( ). This makes it possible to parse a JSON document very easy and fast in the case that the program parsing the JSON document is also written in JSON. With JSON, it should be possible to define a vector graphic format that can be later evaluated by the JavaScript engine. This approach makes it possible to parse a vector graphic structure very fast. However, this structure must be later interpreted by a renderer and translated in graphic commands. This is necessary because JSON is designed to represent data structures and no kind of programming API is provided.

As alluded to above, certain example embodiments pertain to Abstract Vector Graphics (AVG) techniques. The description below helps to demonstrate example rendering techniques for vector graphics (e.g., how the format is brought to display to a device, such as a computer display). However, the example techniques set forth herein are independent of the concrete definition of AVG and may work for all or at least a wide range of vector graphic formats. Thus, the term "AVG" herein could be replaced with a specific vector graphics format.

Although certain example code fragments are presented below in accordance with a Java-like syntax, it will be appreciated that any other programming language (such as, for example, C, C++, C#, ActionScript, etc.) may be used, e.g., if some common abstractions (such as, for example, subroutines/methods, global variables and constants, etc.) are provided.

A first example relates to a simple yellow rectangle with a dashed red border. The following representation may be used to create such an example image:

```
setBrush('#ffff00')
setShape(Rectangle(338, 396, 524, 308))
fill( )
setPen(6, DASHED, '#ff0000')
draw( )
```

As will be appreciated, then, the AVG includes a list of commands. The renderer, by contrast, is responsible for displaying the AVG graphic on a certain device (e.g., a computer monitor, printer, etc.). Thus, the renderer has a state, since some commands change the state of the renderer and other commands implicitly make reference to the state. For example, among others, the state of the renderer contains a brush. The command setBrush('#ffff00') in the example above will change the renderer's brush to '#ffff00' (i.e. "yellow").

Another member of the state of the renderer is the shape. The next command, setShape(Rectangle(338, 396, 524, 308)), will change it to a rectangle with the above x position, y position, width and height respectively.

The next command, fill( ), is an example of a command that implicitly uses the renderer's state, in the sense that it will draw a shape on the target device using the renderer's current shape, which is filled with the renderers current brush.

The next command, setPen(6, DASHED, '#ff0000'), changes yet another member of the renderers state namely the pen. The pen has a width (6), as well as a style and color. Finally, the draw( ) command will use the renderer's current shape and draw its outline onto the screen by using the renderer's current pen.

Vector graphics formats like AVG are powerful enough to allow the representation of complex graphics, e.g., for the graphics used in Business Process Modeling Notation (BPMN) or UML diagrams, as well as the model types provided by ARIS.

An AVG could be created by hand. However, a more generic solution is to write a program that has as an input, for example, a BPMN or UML diagram in an appropriate format and that has as an output a corresponding AVG. A Java module that can be used in a Java application (e.g., in ARIS Express), for example, may be used generate AVG files. The created module translates the Java AWT Graphics API into AVG graphic commands. Similar approaches can be found in the Java word for creating SVG or other vector based graphic formats.

Figure 8:
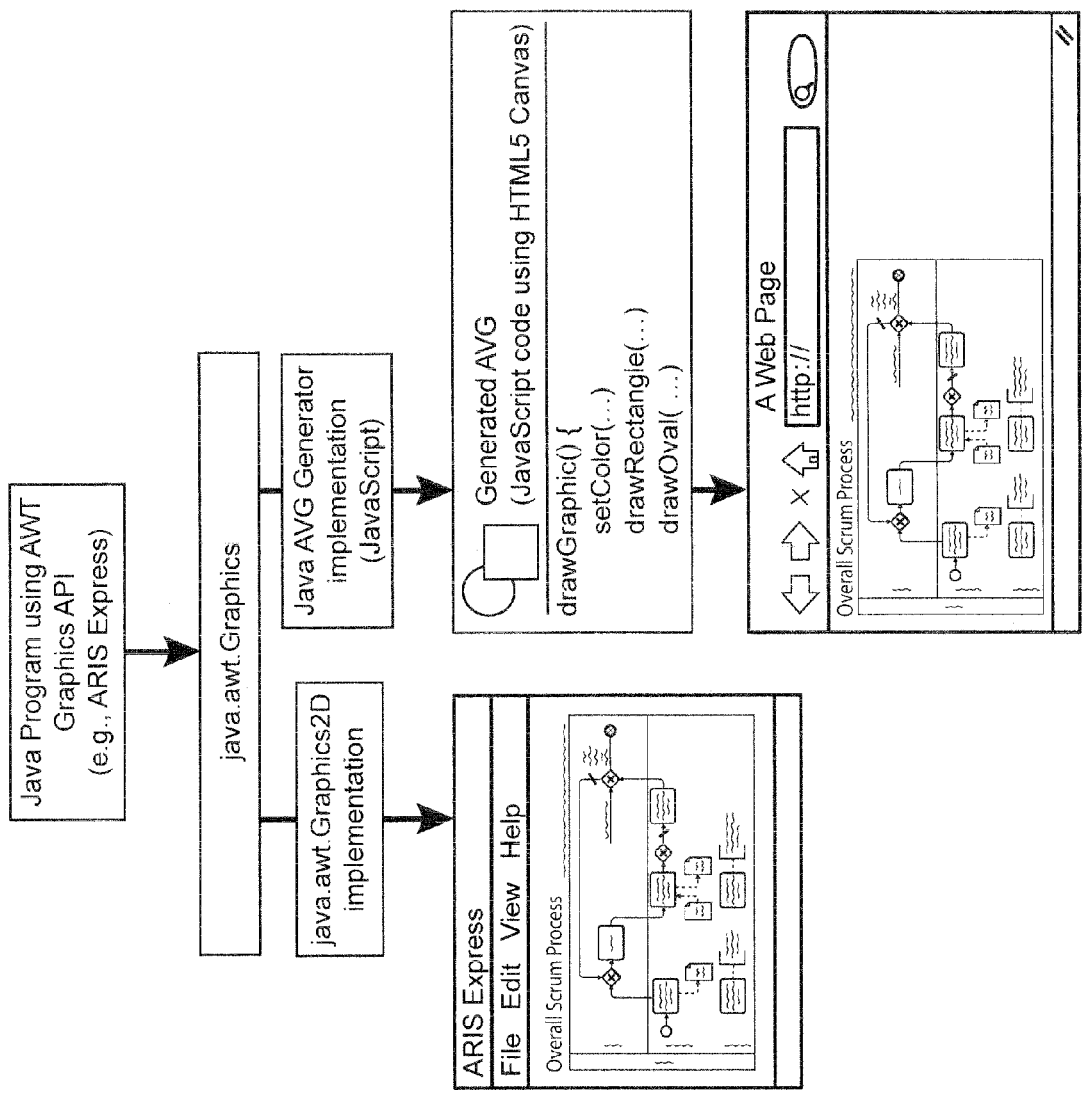
FIG. 8 shows an example AVG graphic generator extending appropriate Java classes in accordance with certain example embodiments.

FIG. 8 shows an example AVG graphic generator extending appropriate Java classes in accordance with certain example embodiments. The Java Abstract Windowing Toolkit (AWT) component includes a graphics implementation, which supports the display of conventional graphics formats in ARIS Express. However, the AWT component also includes a Java AVG Generator, which is configured to generate AVG formatted graphics (e.g., JavaScript code using an HTML 5 Canvas) that are displayable in a webpage or on a suitable device.

Figure 9:
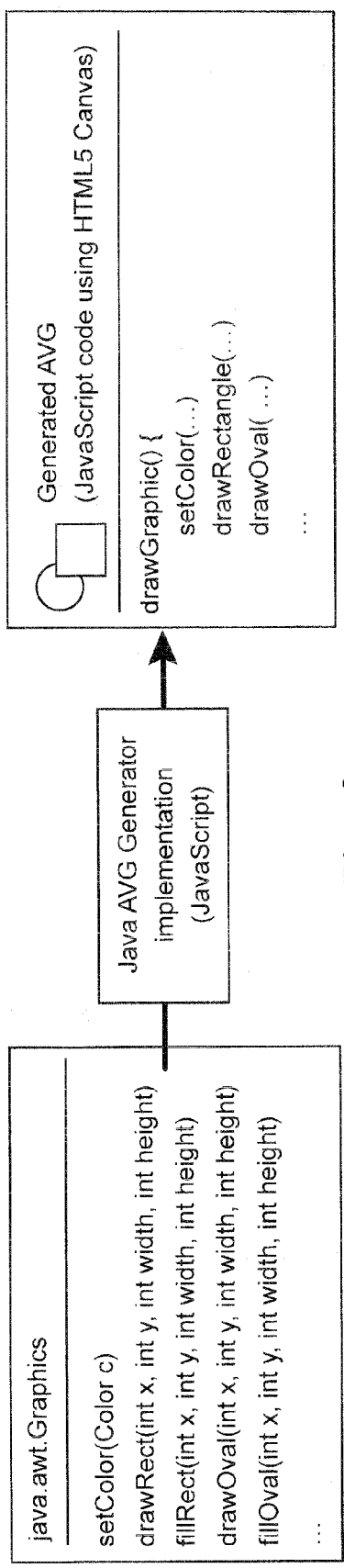
FIG. 9 is an example of a Java AVG generator that converts a first input graphics format to a second JavaScript-type AVG format in accordance with certain example embodiments.

FIG. 9 is an example of a Java AVG generator that converts a first input graphics format to a second JavaScript-type AVG format in accordance with certain example embodiments. The AVG generator of certain example embodiments translates the Java AWT Graphics command into AVG graphic commands. Thus, it is possible in certain example instances to display the same graphic in a Java application as well as in a web browser. The implementation of the created AVG generator is straightforward because the different graphic APIs in the different platforms and programming languages are very similar. Thus, it also is possible to translate the Java AWT Graphics commands into AVG Graphic commands. For example, the graphic API of Adobe Flex, Java AWT, and JavaScript (HTML 5) provide similar graphic geometries and commands. It will be appreciated, however, that other input graphic formats may be used in different implementations, and/or that the format for the AVG also may vary in different implementations.

Figure 10:
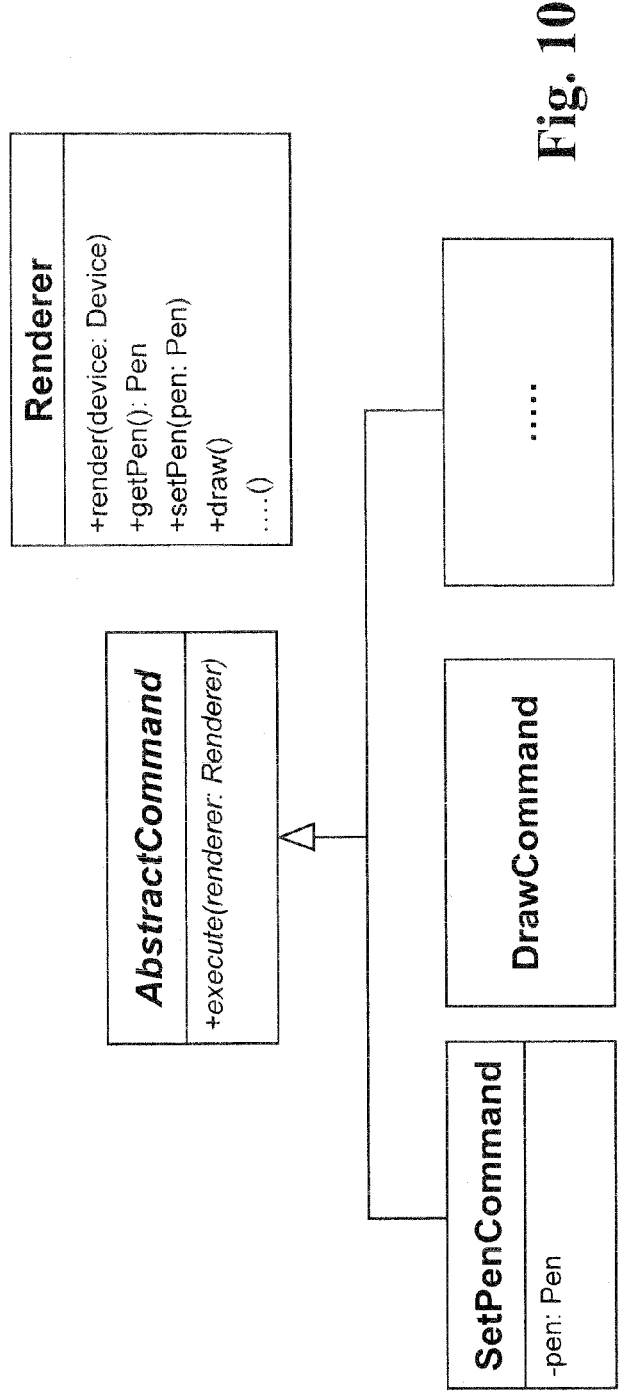
FIG. 10 is an excerpted version of an example class hierarchy of commands for an AVG in accordance with certain example embodiments.

In a first approach, an AVG may be handed to the renderer, e.g., in form of a file. This file may include, for example, an XML representation of the AVG. The renderer may parse the XML file and build up some internal data structure including the list of commands of the AVG. FIG. 10 is an excerpted version of an example class hierarchy of commands for an AVG in accordance with certain example embodiments. Each command included in the AVG will be represented by a subclass of the abstract superclass AbstractCommand. For example, the class SetPenCommand represents the command setPen, which has a single attribute, namely, the pen to be set.

The rendering (which includes the execution of the commands) is straightforward when this approach is adopted. For instance, the AbstractCommand may have an abstract method execute, which thus is implemented by every subclass. The method render of class Renderer, which will display the AVG to a concrete device, may then be structured as follows:

```
public void render(Device device) {
    AbstractCommand commands[ ] = getCommands( );
    for (AbstractCommand command: commands) {
        command.execute(this);
    }
}
```

The implementation of the method execute in the various subclasses of AbstractCommand may forward this again to the class Renderer, which will know how to perform a certain operation on the device. For example the implementation of execute in class DrawCommand may be implemented as follows:

```
public void execute(Renderer renderer) {
    renderer.draw( );
}
```

Building on this basic approach, as indicated above, certain example embodiments involve a separate program that can be directly executed on the target device (e.g., a programming language) with the advantage that the parsing step of AVG can be skipped. It is not necessary to parse the AVG structure and build up some internal data structure containing the list of commands of the AVG in certain example embodiments.

FIG. 11 is an example Java program for the AVG commands shown and described above in connection with the yellow box with red dashed border image, in accordance with certain example embodiments. In the above example, the definition of the class AbstractCommand and its subclasses has been omitted for clarity. The variable commands includes the list of commands to be displayed by the renderer. It is initialized by program code that builds all needed concrete commands and assigns this array to commands. To render the graphics (via the method render), it is possible to iterate over all commands and simply call execute on each of these.

Figure 12:
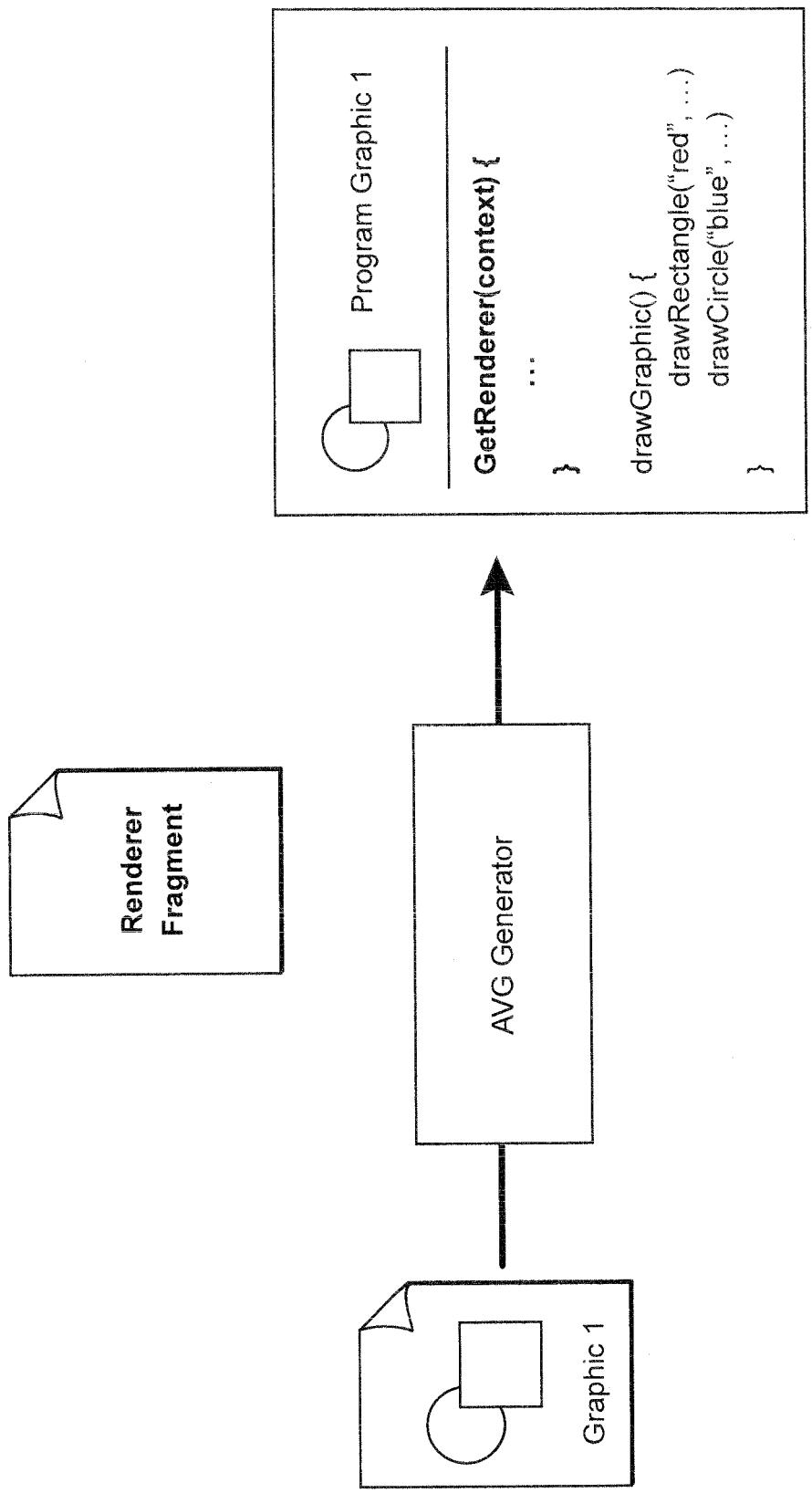
FIG. 12 is a modified version of FIG. 9 that also accepts as input a renderer fragment file, in accordance with certain example embodiments.

The created program includes some constant part that is independent of the concrete AVG to be displayed, in addition to the commands of the concrete AVG. Thus, the creation of the AVG as described above in connection with FIG. 9 may be adapted as shown in FIG. 12. As shown in FIG. 12, a renderer fragment is provided to the AVG generator. The renderer fragment includes static code that is independent from the generated graphic. The renderer fragment also may be platform dependent and contain the overall structure or frame that makes it possible to execute the graphic program or code on the target platform. In other words, the AVG generator for a concrete target language may have as input a program fragment, in addition to the graphic, and it may emit one or more program files that can be later compiled or interpreted. It will be appreciated that the target programming language may be either hard coded into the generator and/or could be a parameter passed to or selected from the generator, providing more flexibility for the created output format. The AVG generator may include a processor for performing these and/or other functions, and/or various receivers for receiving the renderer fragment file, a representation of the graphical model (which may be an XML file, e.g., in BPMN, UML, or other acceptable format), etc. Non-transitory computer readable storage mediums also may be provided for at least temporarily storing these and/or other files including, for example, the output AVG file, libraries used in its creation, compilers, test systems, etc.

In view of the foregoing, it will be appreciated that certain example embodiments relate to techniques that create a program for the display of a single graphic. As demonstrated below, this example technique may have broad, practical applications across a number of example scenarios.

Figure 13:
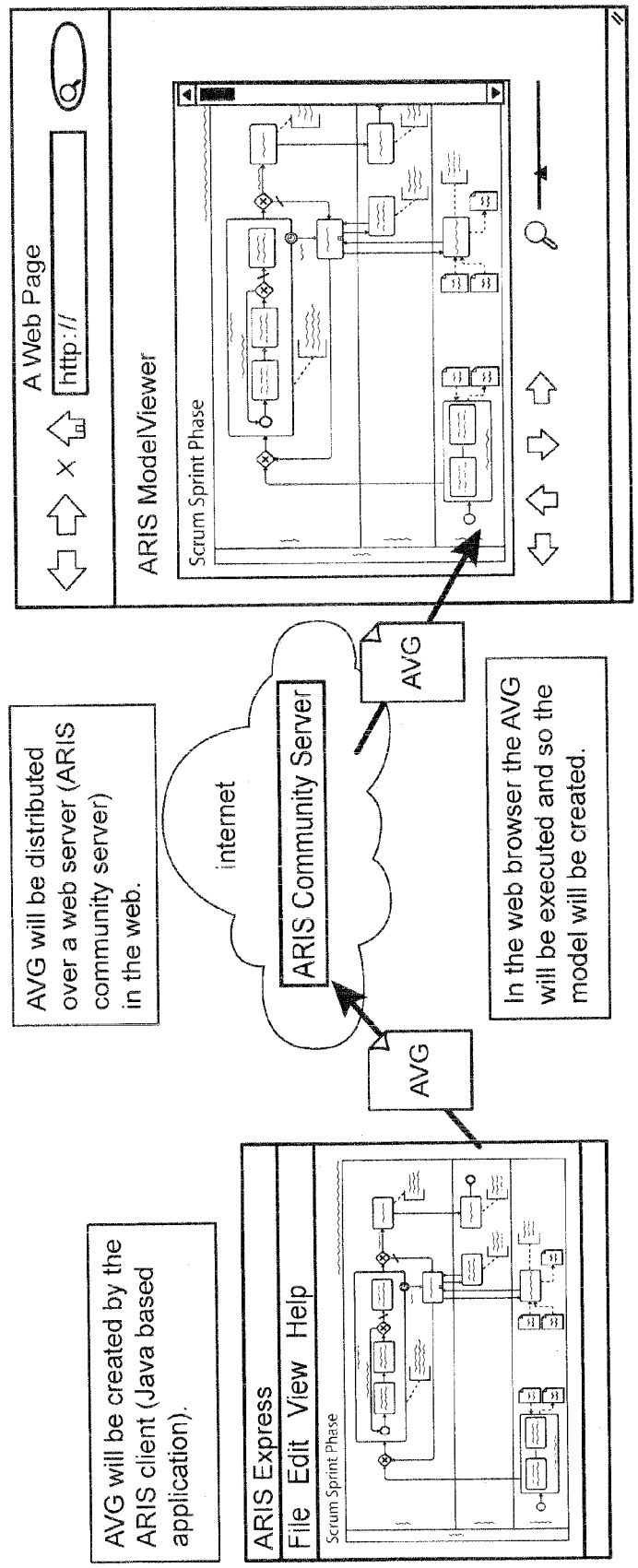
FIG. 13 demonstrates the creation and distribution of an AVG using JavaScript as a target language in accordance with certain example embodiments.

FIG. 13 demonstrates the creation and distribution of an AVG using JavaScript as a target language in accordance with certain example embodiments. In the FIG. 13 example scenario, the AVG is to be displayed in a web browser and, as such, the target device is a frame within the browser. JavaScript is used as the target language in this example, which is advantageous because JavaScript is supported by nearly all modern browsers (including in particular mobile phones and tablet PCs), and JavaScript is an interpreted language (as opposed to ActionScript, for example, which would require an additional compilation step) and, thus, the program can be sent directly from the Web server to the Web browser.

An AVG will be created by the ARIS client (which is a Java-based application, currently). The AVG is distributed over a web server (e.g., the ARIS community server) to a target device, where it is rendered. In other words, the AVG may be executed and thus the graphic will be rendered, causing the model to be created and displayed. Depending on the capabilities of the target browser, the renderer can for example directly make use of HTML 5 Canvas commands or create SVG or VML.

The renderer need not display the graphic at a 100% zoom level. For instance, the renderer may offer added value features including, for example, zooming, scrolling, full screen, and/or other views.

As alluded to above, improvements or optimizations are possible by using features that programming languages provide. Those improvements or optimizations may save a significant amount of both CPU time and main memory, for example. A parsed and interpreted version of the AVG would not necessarily be able to leverage these improvements or optimizations. Example improvements or optimizations are described below.

A first improvement or optimization relates to the use of global constants. It often happens that the same command is used with the same parameters over and over again. For instance, it often happens that the brush is set to black, as in the following example:

```
new SetBrushCommand("#000000"),
new FillCommand( ),
...
new SetBrushCommand("#000000"),
...
new SetBrushCommand("#000000"),
```

This can be replaced through the definition of a single global constant, e.g., as follows:

```
private final static SetBrushCommand S1 =
    new SetBrushCommand("#000000");
S1,
new FillCommand( ),
...
S1,
...
S1,
```

It will be appreciated that this technique can be applied to all commands having no parameters. It also will be appreciated that whole commands can be replaced by constants, as well as repeated patterns, the latter of which often occurs, for instance, in connection with parameters such as for example colors, shapes, etc. Indeed, when bitmaps are used repeatedly, the saving of memory, runtime, and bandwidth can be very large. Example advantages associated with the use of global constants include the ability to save main memory (since some commands and data structures have to be build up only once), achieve better performance at runtime (again, some commands and data structures have to be build up only once), reduce the size of generated code (which, for example, could reduce parsing time used by the compiler or interpreter, bandwidth consumption in the event that the program code has to be sent over a network connection such as the Internet, etc.), and/or the like.

Another improvement or optimization relates to the use of auxiliary functions. A construct that is provided by every major programming language are functions (or called "methods" in object oriented languages). Such functions or methods can be used to reduce the size of the generated code and thus save bandwidth. For instance, every occurrence of new SetBrushCommand ("#000000") could be replaced with a single method call to c1 ("#000000"), where c1 is defined as:

```
public SetBrushCommand c1(String color) {
    return new SetBrushCommand(c);
}
```

Figure 14:
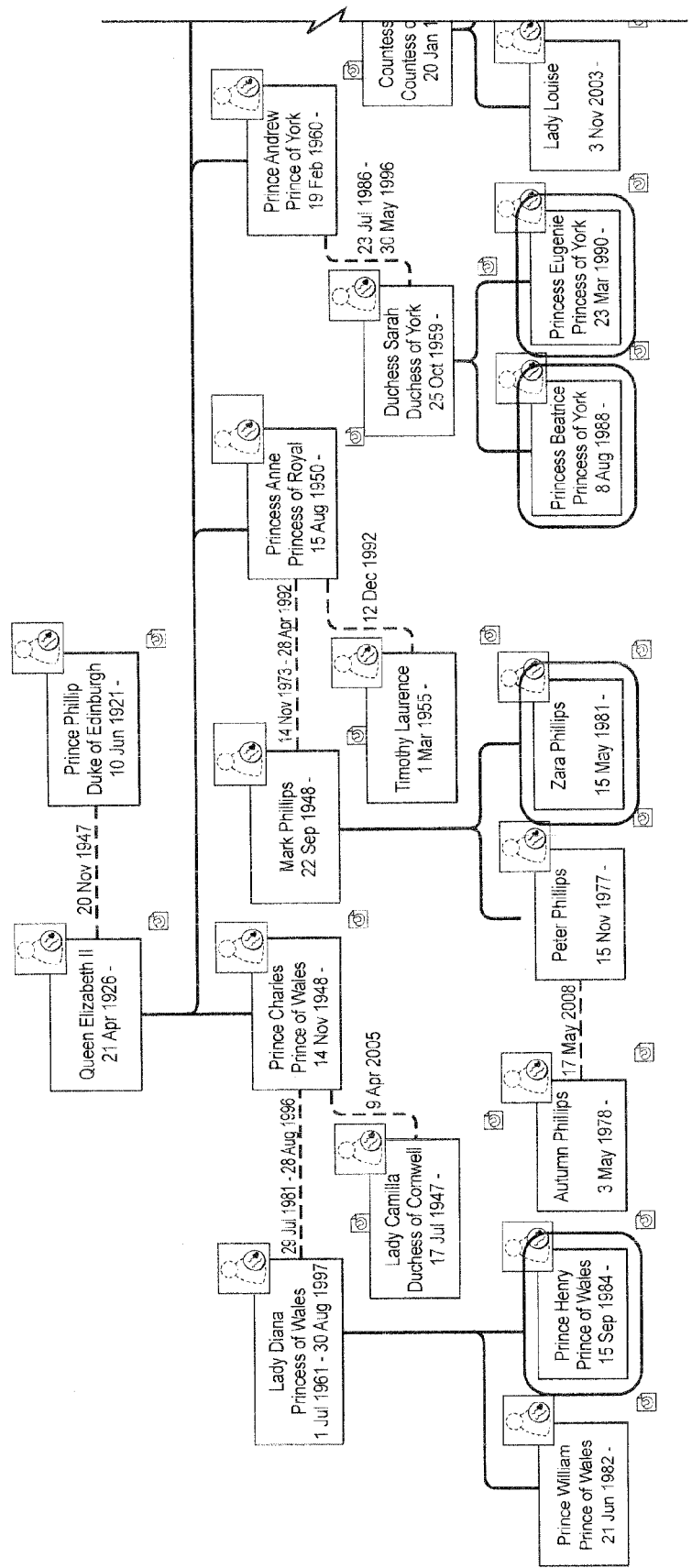
FIG. 14 is an example complex graphic that can benefit from auxiliary functions embedded into an AVG in accordance with certain example embodiments.

In addition to being able to replace single commands with an auxiliary function, it also may be possible to repeat sequences of commands. FIG. 14 is an example complex graphic that can benefit from auxiliary functions embedded into an AVG in accordance with certain example embodiments. As can be seen in the FIG. 14 example image, the same symbol is used many times. Because the symbol is quite complex (e.g., including a 3D effect, shading, an icon in the top right corner, etc.), it many include many AVG commands. A new auxiliary function F may therefore be created, with the auxiliary function F including those commands. Auxiliary function F could be called for every place where this otherwise complicated symbol is used.

It will be appreciated that command sequences will not always be the same, e.g., because the x- and y-coordinates for the symbols may differ. In this example, the following pattern may be involved:

```
...
new SetShapeCommand(new Rectangle(100, 200, 524, 308)),
new FillCommand( ),
...
new SetShapeCommand(new Rectangle(350, 150, 524, 308)),
new FillCommand( ),
...
```

The complexity may be solved by providing function F with two parameters for the x- and y-coordinates. Thus, the two sequences above can be replaced by the following example code fragment:

```
...
F(100, 200),
...
F(350, 150),
...
```

If there are more differences in the patterns, more parameters may be provided to F. F could be defined as follows:

```
public F(int x, int y) {
    return {
        new SetShapeCommand(new Rectangle(x, y, 524, 308)),
        new FillCommand( )
    };
}
```

Because two commands are being replaced by sub-sequence of commands, F may be a new class inheriting from AbstractCommand and implementing execute as follows (e.g., as opposed to being a function itself). Thus, for example:

```
private class F extends AbstractCommand {
    private final int x, y;
    public F(int x, int y) {
        this.x = x;
        this.y = y;
    }
    public void execute(Renderer r) {
        new SetShapeCommand(
            new Rectangle(x,y,524,308)).execute(r);
        new FillCommand( ).execute(r);
    }
}
```

It will be appreciated that this technique may be used recursively, e.g., inside the execute method F, other synthetic commands may be called, as well.

Thus, it will be appreciated that the use of auxiliary functions may help to reduces the size of the generated code and, thus, to reduce compilation time and/or bandwidth consumption.

Another improvement or optimization relates to the use of inlining. The program listing in FIG. 13 may be implemented as follows:

```
public class Renderer {
    public void render(Device device) {
        new SetBrushCommand("#ffff00").execute(this);
        new SetShapeCommand(new Rectangle(338, 396, 524, 308))
            .execute(this);
        new FillCommand( ).execute(this);
        new SetPenCommand(6, DASHED, "#ff0000").execute(this);
        new DrawCommand( ).execute(this);
    }
    ...
```

Assume, for the sake of this immediate example, that the implementation of SetBrushCommand is structured as follows:

```
public class SetBrushCommand extends AbstractCommand {
    private final String brush;
    public SetBrushCommand(String b) {
        this.brush = b;
    }
    public void execute(Renderer r) {
        r.setBrush(brush);
    }
}
```

Thus, it will be appreciated that the execute method simply delegates its task to the renderer again. Accordingly, it becomes possible to replace new SetBrushCommand ("#ffff00").execute (this); in the listing above with setBrush ("#ffff00").

As a result, it is possible to remove AbstractCommand and all of its subclasses. It therefore also becomes unnecessary to build up all of the commands in main memory. Instead, this may be replaced by the program. Accordingly, it is possible to gain main memory at the expense of program size. It will be appreciated, however, that the generated program text file will not change significantly. This tradeoff is desirable for most systems, as usually static program code is handled more efficiently than the creation of dynamic data structures. Indeed, compilers and interpreters are trained to optimize code in numerous ways.

This technique may be very helpful in a number of situations, e.g., on systems where the creation of new objects is expensive and on systems that have limited or expensive garbage collection facilities (for example, JavaScript in Internet Explorer 6).

Figure 15:
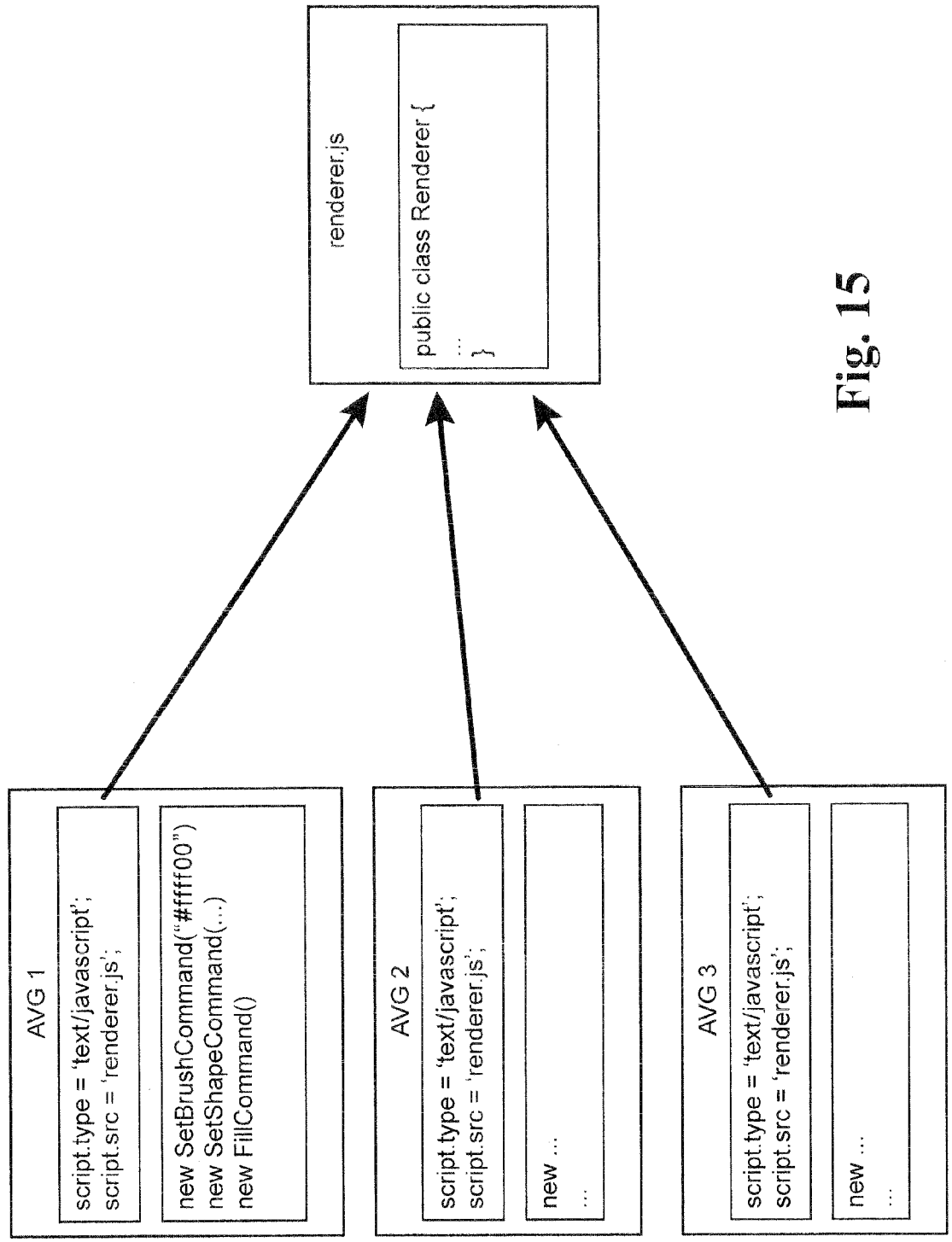
FIG. 15 is a schematic view showing how common code portions in different AVG files can be shared in accordance with certain example embodiments.

Another improvement or optimization relates to the use of split constant and variable code parts. As explained above, in certain example embodiments, the created program code is put together from some constant invariant part (class definitions for commands, renderer, etc.) plus the (variable) commands of the concrete AVG. Assume, for example, that several AVGs are displayed in a browser (either one after the other or all at the same time). In this case, it is a waste of bandwidth to download the constant part again and again. It is possible, however, to split the program file into a single file containing the constant part, which is then shared by all other scripts, and the variable part. Proxies and web browser caching techniques then may help ensure that the constant part is downloaded to the client a reduced or minimal number of times. The splitting may be particularly advantageous in interpreted languages such as, for example, JavaScript. FIG. 15 is a schematic view showing how common code portions in different AVG files can be shared in accordance with certain example embodiments. As can be seen in FIG. 15, the common portion(s) are identified and transported only once to the renderer.js file, allowing for reuse of the common portion. As a result, only the different portions of the AVGs need to be downloaded in order for all graphics to be displayed correctly.

Still another improvement or optimization relates to skipping commands outside of the view port. As discussed above, the renderer may display the AVG on the target device in different zoom steps. In case the AVG and/or the zoom factor is large, it might happen that the whole AVG will not fit completely into the target device (e.g., the screen or the web browser's frame). In this case, parts of the graphic will not be visible to the user unless a subsequent pan or zoom action is taken. Depending on the target device, the renderer may create the graphic completely from scratch when the zoom factor changes or the viewport changes. In principle, it is not necessary to execute the commands that create graphic output in an area which is not visible, e.g., do not lie within the view port and thus correspond to parts of the AVG that are not visible.

This may be possible when it is known in advance that some visible command will not be used in the future. It may in some cases be possible to adapt the implementation of fill such that it fetches the current shape S from the renderer and first checks whether S overlaps the view port.

There are some cases where it is possible to skip a whole set of commands, as most vector graphics provide commands such as saveState (which saves the whole state of the renderer onto a stack and which is also part of the renderer) and restoreState (which pops the top most entry E from the stack and restores the renderers state to E):

These commands may be used, for example, when a set of commands is to be executed and one wants to be sure that afterwards the state of the renderer is the same as before executing the commands. Thus, this pattern of commands may be used, for example, when implementing the auxiliary functions techniques described above. Consider the following example, in which $C_1, \ldots C_n$ are arbitrary commands:

```
saveState( );
C1;
C2;
...
Cn;
restoreState( );
```

This command sequence can be replaced by the following:

```
Rectangle bounds = new Rectangle(...);
if (renderer.getViewPort( ).overlaps(bounds)) {
    saveState( );
    C1;
    C2;
    ...
```

-continued

```
        Cn;
        restoreState( );
}
```

Here, the variable bounds includes the bounding rectangle for the commands $C_1, \ldots C_n$, which can be determined by statically analyzing $C_1, \ldots C_n$.

As will be appreciated from the above, the AVG may be defined in any suitable fashion. Formalistic representations are possible. What follows below, however, is a higher level of abstraction, and semantics are not defined in a strict mathematical formulation. It will be appreciated, however, that the following illustration includes all of the information needed to allow one skilled in the art to build a renderer for the AVG for a target device.

With respect to the state of the renderer, it will be appreciated that an AVG may include a sequence of commands, described in greater detail below. Each command will either change the display of the output device or the state of the renderer. The semantics of those members will become clear as the semantics of the commands are described below. The state of the renderer may include the following and/or other members: pen, brush, font, shape, transform, clip, alpha, stateStack, etc.

The following is an example AVG definition in Backus-Naur Form:

| | | |
|---|---|---|
| AVG | ::= | [command]* |
| command | ::= | setTransform(transform) \| |
| | | addTransform(transform) \| |
| | | setClip(clip) \| |
| | | addClip(clip) \| |
| | | drawImage(image, $d_{x1}$, $d_{y1}$, $d_{x2}$, $d_{y2}$, $s_{x1}$, $s_{y1}$, $s_{x2}$, $s_{y2}$) \| |
| | | setShape (shape) \| |
| | | setFont(fontName, fontFace, fontSize) \| |
| | | fill \| |
| | | Draw \| |
| | | setBrush(brush) \| |
| | | setPen(pen) \| |
| | | setAlpha(double) \| |
| | | drawText(string, x, y) \| |
| | | saveState \| |
| | | restoreState |
| transform | ::= | < $m_{00}$, $m_{01}$, $m_{02}$, $m_{10}$, $m_{11}$, $m_{12}$ > |
| $m_{ij}$ | ::= | double |
| clip | ::= | shape |
| fontName | ::= | string |
| fontFace | ::= | PLAIN \| BOLD \| ITALIC \| BOLDITALIC |
| fontSize | ::= | integer |
| pen | ::= | < penWidth, penStyle, color > |
| penWidth | ::= | integer |
| penStyle | ::= | SOLID \| DASHED \| DOTTED |
| color | ::= | < red, green, blue> |
| red | ::= | integer |
| green | ::= | integer |
| blue | ::= | integer |
| brush | ::= | TRANSPARENT \| |
| | | SOLID(color) \| |
| | | GRADIENT(color, color, x1, y1, x2, y2) |
| shape | ::= | [segment]* |
| segment | ::= | CLOSESEG \| |
| | | LINETO(x, y) \| |
| | | MOVETO(x, y) \| |
| | | CUBICTO(x1, y1, x2, y2, x3, y3) |
| $x_i$, $y_i$ | ::= | integer |
| $d_{xi}$, $d_{yi}$, $s_{xi}$, $s_{yi}$ | ::= | integer |
| image | ::= | byte array |

The following table provides example semantics for the commands listed above:

| Command | Description |
|---|---|
| setTransform(transform) | Can be used for zooming, scaling, shear, etc., of subsequent commands. transform defines an affine transformation matrix. Side effect: changes the transform member of the state. |
| addTransform(transform) | Similar to setTransform, but concatenates its parameter with the state's current transform (instead of overriding it). Side effect: changes the transform member of the state. |
| setClip(clip) | Sets the current clip, which means that all subsequent drawing commands will have no effect on the area that lies outside of clip. Side effect: changes the clip member of the state. |
| addClip(clip) | Analogous to setClip but will concatenate its member to the current clip (instead of overriding it). Side effect: changes the clip member of the state. |
| drawImage(image, $d_{x1}$, $d_{y1}$, $d_{x2}$, $d_{y2}$, $s_{x1}$, $s_{y1}$, $s_{x2}$, $s_{y2}$) | Draws an encoded (e.g., a PNG encoded) image onto the target device (at a defined specified area). |
| setShape (shape) | Sets the shape member of the state (used by subsequent fill and draw commands). Side effect: changes the shape member of the state. |
| setFont(fontName, fontFace, fontSize) | Side effect: changes the font member of the state. |
| fill | Draws a filled shape onto the output device using the members shape and brush of the state. |
| Draw | Draws the outline of a shape onto the output device using the members shape and pen of the state. |
| setBrush(brush) | Side effect: changes the brush member of the state. |
| setPen(pen) | Side effect: changes the pen member of the state. |
| setAlpha(double) | Side effect: changes the alpha member of the state. |
| drawText(string, x, y) | Draws a string at position x and y onto the output device using the font member of the state. |
| saveState | Makes a copy of the complete state and pushes it onto stateStack. |
| restoreState | Pops the topmost entry from stateStack and sets the current state to this. |

It will be appreciated that the example commands, semantics, etc., may be the same or different in different example embodiments of this invention. In addition, alternative labels or language may be used to identify and/or trigger the commands, semantics, etc., in different example embodiments. In certain example embodiments, some or all of the above and/or other commands and/or semantics above may be implemented in any suitable combination or sub-combination. For instance, certain example embodiments may include at least drawImage, setShape, fill, draw, setBrush, and setPen commands.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of generating a self-contained Abstract Vector Graphics (AVG) file for subsequent display via a software application on a remote device, the self-contained AVG file corresponding to a graphical business process model generated in a business process management (BPM) software package, the method comprising:
   receiving information pertaining to the model; and
   generating, via at least one processor, the self-contained AVG file based on (a) the received information pertaining to the model, and (b) a renderer fragment file that includes code that is dependent on a computing platform of the remote device on which the model is to be displayed but independent from the received information pertaining to the model,
   wherein generating the self-contained AVG file includes converting the model into executable instructions for causing the model to be displayed in the software application on the remote device.

2. The method of claim 1, wherein the AVG file is written in an interpreted language.

3. The method of claim 2, wherein the AVG file is written in JavaScript.

4. The method of claim 1, wherein the AVG file is compiled.

5. The method of claim 1, wherein the AVG file comprises a plurality of vector-based commands, each said vector-based command having a predetermined syntax and associated semantics.

6. The method of claim 1, further comprising forwarding the AVG model to the remote device over a network connection.

7. The method of claim 6, wherein the AVG model is generated on a device hosting the BPM software package.

8. The method of claim 1, further comprising causing the display of the model on the remote device without parsing the AVG file.

9. The method of claim 1, wherein the information pertaining to the model is received in BPMN and/or UML form.

10. The method of claim 1, wherein the information pertaining to the model is received as an XML document.

11. The method of claim 1, wherein the executable instructions are provided in accordance with a selected programming language, and further comprising optimizing the instructions based on one or more functions available as a result of the selected programming language.

12. A non-transitory computer readable storage medium tangibly storing instructions for performing the method of claim 11.

13. The method of claim 1, further comprising modifying the instructions as initially generated by using global constants, defining auxiliary functions and/or relying on inheritance, performing inlining, splitting constant and variable code parts, and/or skipping commands that would result in the display of elements outside of a viewable area of the software application.

14. A non-transitory computer readable storage medium tangibly storing instructions for performing the method of claim 1.

15. The method of claim 1, wherein the AVG file includes executing commands that are independent of the graphical business process model to be displayed and executing commands that are dependent on the graphical business process model to be displayed.

16. The method of claim 1, wherein the code in the renderer fragment file is independent from the model to be displayed.

17. A method of displaying a graphical model on a remote device, the method comprising:
   receiving a self-contained Abstract Vector Graphics (AVG) file on the remote device, the self-contained AVG file having been generated based on (a) information pertaining to the model, and (b) static code that is dependent on a computing platform of the remote device on which the model is to be displayed but independent from the information pertaining to the model,
   the self-contained AVG file including executable instructions for causing the model to be displayed on the remote device, the instructions including vector-based commands associated with the re-creation of the model for display on the remote device, each said vector-based command having a predetermined format; and
   executing the instructions in the self-contained AVG file on the remote device so as to cause the model, or a portion thereof, to be re-created within a viewable area of a display provided thereto.

18. The method of claim 17, wherein the model is a graphical business process model generated in a business process management (BPM) software package.

19. The method of claim 18, wherein the model is displayed in a browser running on the remote device.

20. The method of claim 17, wherein the AVG file is in an interpreted language.

21. The method of claim 20, wherein the AVG file is in JavaScript.

22. The method of claim 17, wherein the displaying is practiced without parsing of the AVG file.

23. An Abstract Vector Graphics (AVG) generator, comprising:
   a receiver configured to receive information pertaining to a graphical business process model generated in a business process management (BPM) software package; and
   at least one processor configured to generate a self-contained AVG file based on (a) the information pertaining to the model received by the receiver, and (b) a renderer fragment file that includes code that is dependent on a computing platform of a remote device on which the model is to be displayed but independent from the received information pertaining to the model, wherein the at least one processor is further configured to structure the self-contained AVG file as vector-based instructions so that the self-contained AVG file is executable in software running on the remote device.

24. The AVG generator of claim 23, wherein the AVG file includes code in a language to be interpreted by the software running on the remote device.

25. The AVG generator of claim 23, wherein the AVG file is compiled for subsequent execution on the remote device.

26. The AVG generator of claim 23, wherein the AVG file is composed for execution by a browser running on the remote device, any parsing of the AVG file on the browser being unnecessary.

27. The AVG generator of claim 23, further comprising a programming language optimizer configured to leverage optimization functions made available as a result of the programming language in which the instructions are written to modify the instructions in order to improve the ultimate efficiency of the AVG file upon execution thereof.

28. A business process management (BPM) system, comprising:
a software tool configured to generate a graphical business process model, the graphical business process model being representable as an XML file; and
an Abstract Vector Graphics (AVG) generator comprising:
a receiver configured to receive the XML file corresponding to the generated graphical business process model, and
at least one processor configured to generate a self-contained AVG file based on the XML file and code that is dependent on a computing platform of a remote device on which the model is to be displayed but independent from the received information pertaining to the model,
wherein the at least one processor is further configured to structure the self-contained AVG file as vector-based instructions so that the AVG file is executable in a software application on the remote device.

29. The system of claim 28, further comprising a distributable, platform specific AVG renderer configured to receive AVG files and cause received AVG files, or portions thereof, to be displayed on a device hosting the AVG renderer.

30. A method of generating an Abstract Vector Graphics (AVG) file, the method comprising:
receiving input corresponding to one or more graphical elements in an image;
processing, via at least one processor, the input to generate a set of commands that, when executed, cause the image or a portion thereof to be displayed on a display device; and
storing the set of commands in an executable file on a non-transitory computer readable storage medium for subsequent execution on the display device,
wherein the commands are selected from a list of drawing commands including at least the following members:
a set transform command that defines an affine transformation matrix and changes a transform member of a state associated with the display device,
an add transform command that concatenates a parameter of the add transform command with the current transform member of the state,
a set clip command that defines an area in which drawing commands have an effect and changes a clip member of the state,
an add clip command that concatenates a parameter of the add clip command with the current clip member of the state,
a draw image command that draws an encoded image on the display device,
a set shape command that sets a shape member of the state,
a set font command that changes a font member of the state,
a set brush command that changes a brush member of the state,
a set pen command that changes a pen member of the state,
a set alpha command that changes an alpha member of the state,
a fill command that draws a filled shape on the display device using the shape and brush members of the state,
a draw command that draws an outline of a shape on the display device using the shape and pen members of the state,
a draw text command that draws a string at a specified location on the display device using the font member of the state,
a save state command that makes a copy of the complete state and pushes it onto a state stack, and
a restore state command that pops a topmost entry from the state stack and sets the current state to the popped topmost entry.

31. A non-transitory computer readable storage medium tangibly storing instructions for performing the method of claim 30.

32. A method of displaying on a display device an image or portion thereof stored in an Abstract Vector Graphics (AVG) file, the method comprising:
receiving the AVG file; and
executing commands stored in the AVG file via at least one processor so as to display the image or portion thereof,
wherein the commands include at least the following drawing commands:
a set transform command that defines an affine transformation matrix and changes a transform member of a state associated with the display device,
an add transform command that concatenates a parameter of the add transform command with the current transform member of the state,
a set clip command that defines an area in which drawing commands have an effect and changes a clip member of the state,
an add clip command that concatenates a parameter of the add clip command with the current clip member of the state,
a draw image command that draws an encoded image on the display device,
a set shape command that sets a shape member of the state,
a set font command that changes a font member of the state,
a set brush command that changes a brush member of the state,
a set pen command that changes a pen member of the state,
a set alpha command that changes an alpha member of the state, a fill command that draws a filled shape on the display device using the shape and brush members of the state, a draw command that draws an outline of a shape on the display device using the shape and pen members of the state, a draw text command that draws a string at a specified location on the display device using the font member of the state, a save state command that makes a copy of the complete state and pushes it onto a state stack, and a restore state command that pops a topmost entry from the state stack and sets the current state to the popped topmost entry.

33. A non-transitory computer readable storage medium tangibly storing instructions for performing the method of claim 29.

\* \* \* \* \*